(12) United States Patent  
Kim

(10) Patent No.: US 7,041,949 B2  
(45) Date of Patent: May 9, 2006

(54) MICROWAVE OVEN HAVING A TOASTING CAVITY

(75) Inventor: Yoon Gon Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 17 days.

(21) Appl. No.: 10/671,602

(22) Filed: Sep. 29, 2003

(65) Prior Publication Data

US 2004/0144774 A1      Jul. 29, 2004

(30) Foreign Application Priority Data

Jan. 27, 2003   (KR)   .................... 10-2003-0005182

(51) Int. Cl.
*H05B 6/80*   (2006.01)

(52) U.S. Cl. ............... 219/681; 219/685; 219/757; 219/762; 99/451

(58) Field of Classification Search ............ 219/681, 219/685, 756, 757, 762, 763; 99/451, 331, 99/DIG. 14

See application file for complete search history.

(56) References Cited

U.S. PATENT DOCUMENTS

| | | | | |
|---|---|---|---|---|
| 5,990,467 | A | * | 11/1999 | Yang et al. ............... 219/757 |
| 6,005,235 | A | * | 12/1999 | Shin ............................ 219/757 |
| 6,539,840 | B1 | * | 4/2003 | Choi et al. ................... 99/331 |
| 2004/0050841 | A1 | * | 3/2004 | Han et al. ................... 219/685 |

FOREIGN PATENT DOCUMENTS

| | | | | |
|---|---|---|---|---|
| JP | 55-110835 | * | 8/1980 | ............... 219/685 |
| JP | 62-297634 | * | 12/1987 | ............... 219/757 |
| JP | 64-38524 | * | 2/1989 | ............... 219/685 |
| JP | 1-305231 | * | 12/1989 | ............... 219/683 |
| JP | 2-4131 | * | 1/1990 | ............... 219/685 |
| JP | 4-148115 | * | 5/1992 | ............... 219/685 |
| KR | 2003-23056 | * | 3/2003 | |

* cited by examiner

*Primary Examiner*—Philip H. Leung  
(74) *Attorney, Agent, or Firm*—Staas & Halsey LLP

(57) ABSTRACT

Disclosed herein is a microwave oven, which is provided with a toasting cavity in addition to a microwave cooking cavity, thus making well-toasted breads. The microwave oven includes a cabinet which is partitioned into a microwave cooking cavity, a toasting cavity, and a machine room. A microwave generating unit is installed in the machine room to irradiate microwaves into the microwave cooking cavity. A heating unit is installed in the toasting cavity to heat the toasting cavity. A ventilating unit functions to ventilate the toasting cavity.

25 Claims, 3 Drawing Sheets

MICROWAVE OVEN HAVING A TOASTING CAVITY

DESCRIPTION OF REFERENCE CHARACTERS OF MAIN PARTS

Figure 1:
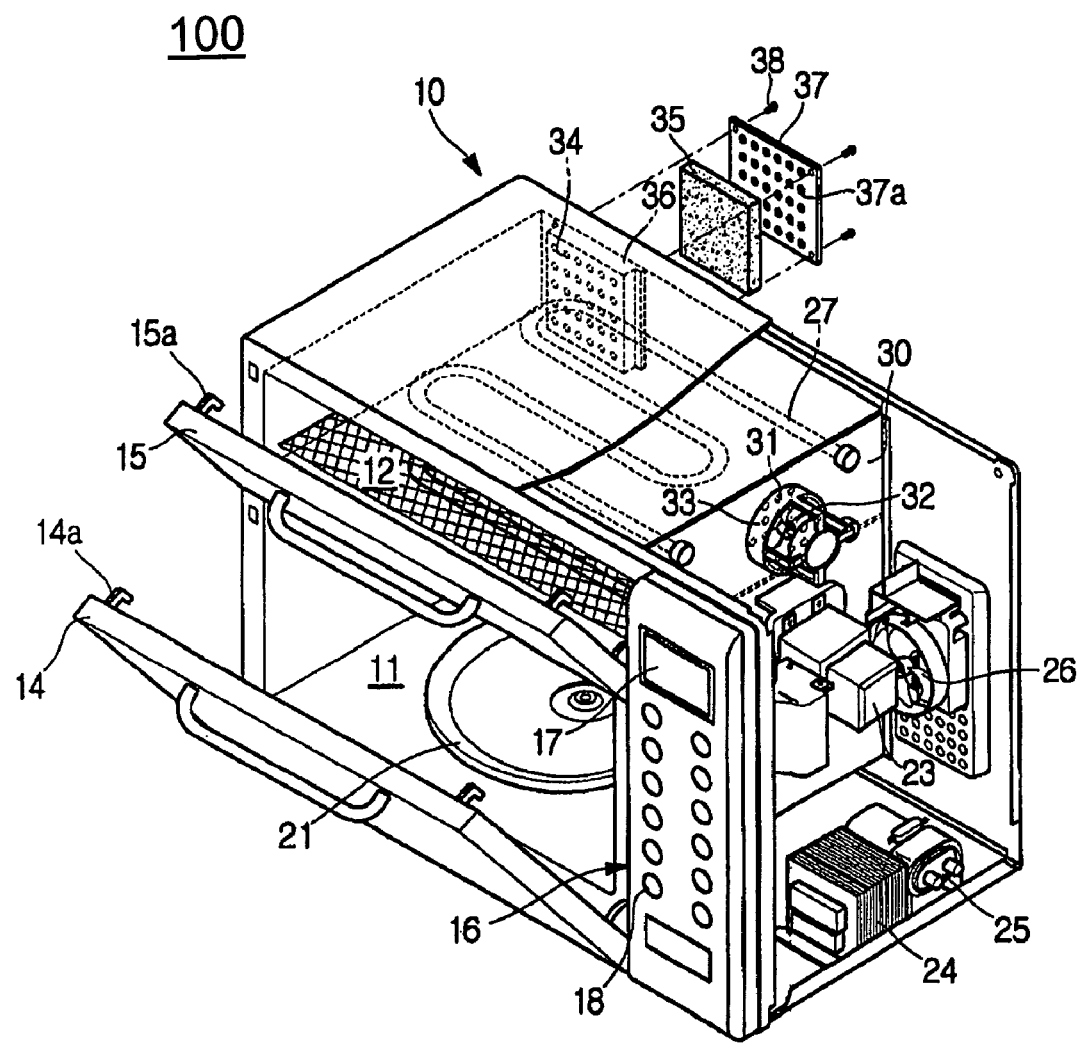
FIG. 1 is a perspective view of a microwave oven, according to the present invention.

| | |
|---|---|
| 10: cabinet, | 11: microwave cooking cavity, |
| 12: toasting cavity, | 13: machine room, |
| 16: control panel, | 23: magnetron, |
| 24: high-voltage transformer, | |
| 25: high-voltage condenser, | |
| 26: cooling fan, | 27: Upper heater, |
| 28: lower heater, | 29: grill member, |
| 31: air inlet port, | 32: ventilating fan, |
| 34: air outlet port, | 35: deodorizing filter. |

DETAILED DESCRIPTION OF THE INVENTION

OBJECT OF THE INVENTION

FIELD OF THE INVENTION AND PRIOR ART

The present invention relates, in general, to microwave ovens and, more particularly, to a microwave oven which is provided with a toasting cavity for toasting bread.

As well known to those skilled in the art, a microwave oven is an appliance which cooks food laid in its cooking cavity using microwaves irradiated from a magnetron into the cooking cavity. That is, a general cooking device cooks food by heating the surface of the food, but the microwave oven is operated such that its magnetron irradiates microwaves into the cooking cavity to vibrate water within food and generate frictional heat within the food, thereby cooking it. Recently, there has been proposed a microwave oven which has a heater in its cooking cavity. The microwave oven cooks food using heat generated from the heater installed in the cooking cavity as well as microwaves, thus more effectively cooking food.

Toast is made by heating the surface of bread. Thus, in case of toasting bread, the conventional microwave oven uses microwaves, so its cooking efficiency is poor, in comparison with conventional electrical heating devices which cook food by heating the surface of food.

Further, the microwave oven having the heater in its cooking cavity may heat bread using heat generated from the heater, thus being capable of toasting the bread. However, such a microwave oven has a problem in that the heater is installed at an upper portion of the cooking cavity, so an additional shelf is needed to place the bread closer to the heater, thus being inconvenient to use. Further, the bread must be turned over during toasting, to uniformly heat both surfaces of the bread, thus being more complicated to use.

OBJECT OF THE INVENTION

Accordingly, it is an aspect of the present invention to provide a microwave oven, which is provided with a toasting cavity in addition to a microwave cooking cavity, thus making well-toasted breads.

Additional aspects and advantages of the invention will be set forth in part in the description which follows and, in part, will be obvious from the description, or may be learned by practice of the invention.

CONSTRUCTION AND OPERATION OF THE INVENTION

The foregoing and other aspects of the present invention are achieved by providing a microwave oven, including a cabinet partitioned into a microwave cooking cavity, a toasting cavity, and a machine room, a microwave generating unit installed in the machine room to irradiate microwaves into the microwave cooking cavity, a heating unit installed in the toasting cavity to heat the toasting cavity, and a ventilating unit to ventilate the toasting cavity.

Further, according to the present invention, the toasting cavity is provided above the microwave cooking cavity, and the machine room is provided at a side of the toasting cavity and the microwave cooking cavity.

The heating unit includes an upper heater installed at an upper portion of the toasting cavity, and a lower heater installed at a lower portion of the toasting cavity. A grill member is provided above the lower heater, with bread being placed on the grill member.

Further, the ventilating unit includes an air inlet port provided at a predetermined portion on a sidewall between the machine room and the toasting cavity, a ventilating fan mounted at the portion of the sidewall through which the air inlet port is formed to circulate air from the machine room into the toasting cavity, and an air outlet port provided at a predetermined portion of a wall of the toasting cavity to discharge air from the toasting cavity to the outside.

A deodorizing filter is provided at the portion of the wall through which the air outlet port is formed to remove odors from the air which is discharged from the toasting cavity to the outside.

The toasting cavity and the microwave cooking cavity are opened at fronts thereof, and doors are mounted to the open fronts of the toasting cavity and the microwave cooking cavity, thus opening or closing the toasting cavity and the microwave cooking cavity, respectively.

A high-voltage transformer and a high-voltage condenser to apply a high voltage to the microwave generating unit, and a cooling fan to cool the high-voltage transformer and the high-voltage condenser are installed in the machine room.

This invention will be described in further detail by way of example with reference to the accompanying drawings.

Figure 2:
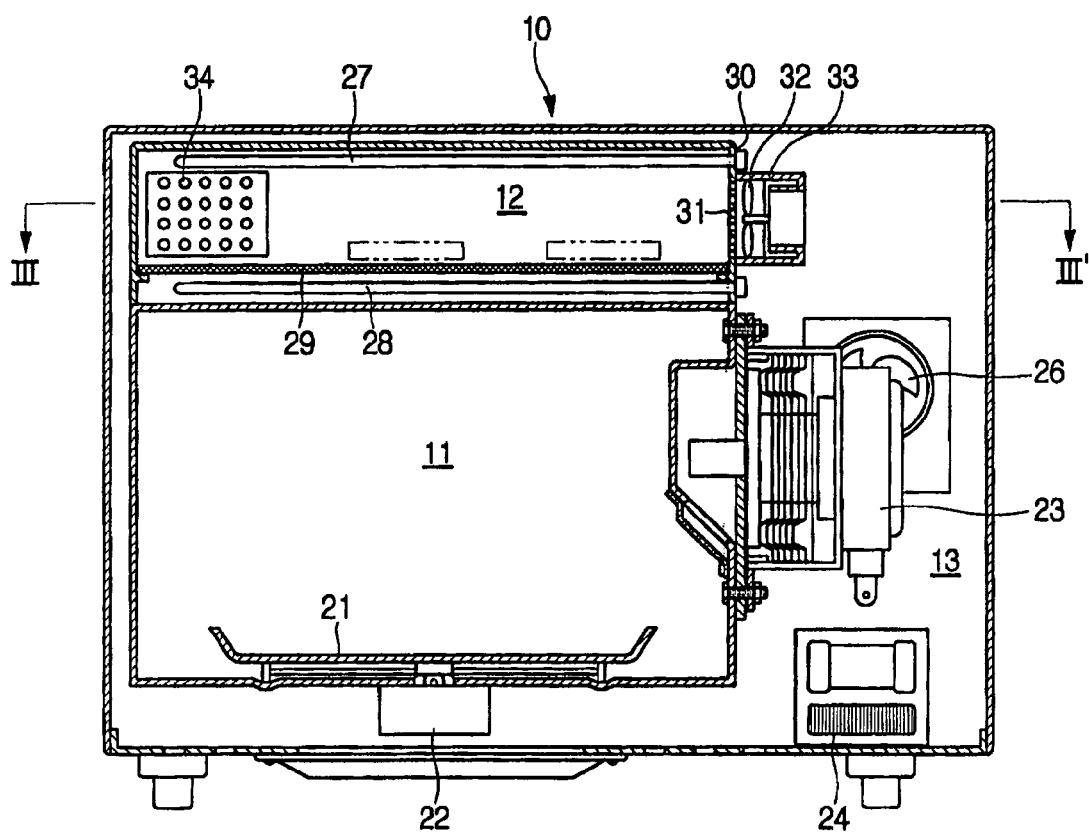
FIG. 2 is a sectional view of the microwave oven, according to the present invention.

As illustrated in FIGS. 1 and 2, a microwave oven according to the present invention includes a cabinet 10. The cabinet 10 is partitioned into a microwave cooking cavity 11, a toasting cavity 12, and a machine room 13. Food is heated and cooked using microwaves in the microwave cooking cavity 11. Bread is toasted in the toasting cavity 12. Several electrical devices are installed in the machine room 13. In this case, the toasting cavity 12 is provided above the microwave cooking cavity 11, and the machine room 13 is provided at a side of the microwave cooking cavity 11 and the toasting cavity 12.

The microwave cooking cavity 11 and the toasting cavity 12 are opened at fronts thereof, thus allowing food to be put into or taken out from the microwave cooking cavity 11 or the toasting cavity 12. Doors 14 and 15 are mounted to the fronts of the microwave cooking cavity 11 and the toasting cavity 12, thus opening or closing the microwave cooking cavity 11 and the toasting cavity 12, respectively. A control panel 16 is mounted to the front of the machine room 13, and is provided with a display unit 17 which displays the operation of the microwave oven and a plurality of control buttons 18 which controls several functions of the microwave oven. The doors 14 and 15 which open or close the microwave cooking cavity 11 and the toasting cavity 12, respectively, are hinged at their lower portions to the fronts of the microwave cooking cavity 11 and the toasting cavity 12 in such a way as to be rotated forward and backward. Hooks 14a and 15a are provided on upper portions of the doors 14 and 15, respectively.

A cooking tray 21 is mounted to a lower portion of the microwave cooking cavity 11 in such a way as to be rotated to uniformly heat food placed on the cooking tray 21. A drive motor 22 is installed in the space between the bottom of the microwave cooking cavity 11 and the cabinet's bottom under the microwave cooking cavity 11 to rotate the cooking tray 21. A magnetron 23, a high-voltage transformer 24, and a high-voltage condenser 25 are installed in the machine room 13. The magnetron 23 irradiates microwaves into the microwave cooking cavity 11. The high-voltage transformer 24 and the high-voltage condenser 25 function to apply a high voltage to the magnetron 23. Further, a cooling fan 26 is mounted to a rear wall of the machine room 13, and functions to blow exterior air into the machine room 13 to cool the electrical devices installed in the machine room 13.

Upper and lower heaters 27 and 28 are mounted to upper and lower portions of the toasting cavity 12, respectively, to heat and toast bread. When power is applied to the microwave oven, the upper and lower heaters 27 and 28 are heated. A grill member 29 made of a plurality of wires is provided above the lower heater 28 in the toasting cavity 12 so that bread is placed on the grill member 29 in such a way as to be spaced apart from the lower heater 28.

Figure 3:
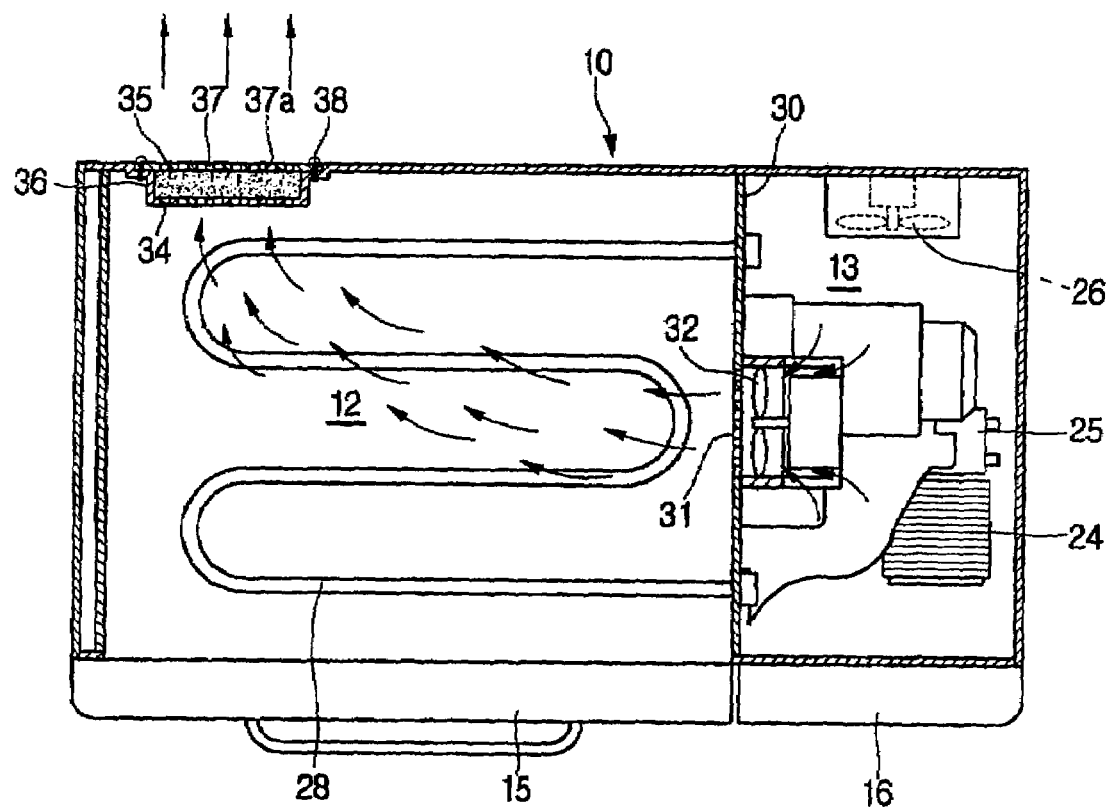
FIG. 3 is a sectional view taken along the line III–III' of FIG. 2.

As illustrated in FIGS. 1 and 3, the toasting cavity 12 is provided with a ventilating unit to ventilate the toasting cavity 12. The ventilating unit includes a plurality of air inlet ports 31, a ventilating fan 32, and a plurality of air outlet ports 34. A sidewall 30 between the machine room 13 and the toasting cavity 12 is perforated at a predetermined area to form the air inlet ports 31. The ventilating fan 32 is mounted at the sidewall through which the air inlet ports 31 are formed, thus circulating air from the machine room 13 into the toasting cavity 12. A rear wall of the toasting cavity 12 is perforated at a predetermined area to form the air outlet ports 34, thus discharging air from the toasting cavity 12 to the outside. Further, a deodorizing filter 35 is provided at the rear wall through which the air outlet ports 34 are formed.

An annular air guide member 33 is provided at the sidewall 30 through which the air inlet ports 31 are formed, and guides air so that it flows into the toasting cavity 12 through the air inlet ports 31 by operation of the ventilating fan 32. Further, a depressed seat 36 is provided at the rear wall of the toasting cavity 12, so that the odorizing filter 35 is seated into the depressed seat 36. A cover member 37 is fastened to the depressed seat 36 using setscrews 38 to cover the odorizing filter 35. A plurality of perforations 37a are provided in the cover member 37.

The operation and use of the microwave oven according to the present invention will be described in the following.

When one desires to heat and cook food using microwaves, the food is laid in the microwave cooking cavity 11. Next, with the operation of the microwave oven, microwaves generated from the magnetron 23 are irradiated into the microwave cooking cavity 11, thus cooking the food.

Meanwhile, when one desires to toast bread, the bread is placed on the grill member 29 installed in the toasting cavity 12. Thereafter, the control panel 16 is manipulated to heat the upper and lower heaters 27 and 28, thus toasting the bread. At this time, smoke and odors generated in the toasting cavity 12 are discharged to the outside by the operation of the ventilating fan 32. That is, when the ventilating fan 32 is operated, air flows from the machine room 13 through the air inlet ports 31 into the toasting cavity 12. Air in the toasting cavity 12 is discharged to the outside through the air outlet ports 34.

Further, smoke and odors in the discharged air are removed while passing the deodorizing filter 35, thus preventing the air of a room from being contaminated by the air discharged from the toasting cavity 12. Further, the bread placed on the grill member 29 is simultaneously heated by the upper and lower heaters 27 and 28, thus allowing both surfaces of the bread to be uniformly toasted.

EFFECT OF THE INVENTION

As apparent from the above description, the present invention provides a microwave oven, which is provided with a toasting cavity in addition to a microwave cooking cavity, thus allowing food to be cooked using microwaves and making well-toasted breads.

What is claimed is:

1. A microwave oven, comprising:
   a cabinet partitioned into a microwave cooking cavity, a toasting cavity, and a machine room;
   a microwave generating unit installed in the machine room to generate microwaves into the microwave cooking cavity;
   a heating unit installed in the toasting cavity to heat the toasting cavity; and
   a ventilating unit having a ventilating fan to ventilate the toasting cavity,
   wherein a high-voltage transformer and a high-voltage condenser installed in the machine room apply a high voltage to the microwave generating unit, and a cooling fan installed in the machine room cools the high-voltage transformer and the high-voltage condenser,
   wherein the toasting cavity and the microwave cooking cavity are opened at fronts thereof, and doors are mounted to the open fronts of the toasting cavity and the microwave cooking cavity, thus opening or closing the toasting cavity and the microwave cooking cavity, respectively.

2. The microwave oven according to claim 1, wherein the toasting cavity is located above the microwave cooking cavity, and the machine room is located at a side of the toasting cavity and the microwave cooking cavity.

3. The microwave oven according to claim 2, wherein the heating unit comprises an upper heater installed at an upper position in the toasting cavity, and a lower heater installed at a lower position in the toasting cavity, and
   a grill member is located above the lower heater, with bread being placed on the grill member.

4. The microwave oven according to claim 2, wherein the ventilating unit comprises:

an air inlet port provided at a predetermined location on a sidewall between the machine room and the toasting cavity;

the ventilating fan mounted at the location on the sidewall through which the air inlet port is formed, thus circulating air from the machine room into the toasting cavity; and an air outlet port located at a predetermined location on a wall of the toasting cavity to discharge air from the toasting cavity to an outside.

5. The microwave oven according to claim 4, further comprising a deodorizing filter at the portion of the wall through which the air outlet port is formed, thus removing odors from the air which is discharged from the toasting cavity to the outside of the microwave oven.

6. The microwave oven according to claim 4, further comprising an annular air guide member on the sidewall through which the air inlet port is formed and guides air into the toasting cavity.

7. The microwave oven according to claim 4, further including a depressed seat on a rear wall of the toasting cavity.

8. The microwave oven according to claim 7, further including a deodorizing filter seated into the depressed seat.

9. The microwave oven according to claim 8, wherein a perforated cover member is fastened to the depressed seat to cover the deodorizing filter.

10. The microwave oven according to claim 1, wherein the doors are rotated forward and backward to open or close the toasting cavity and the microwave cooking cavity, respectively.

11. A microwave oven, comprising:
a microwave generating unit located in a first cavity to generate microwaves into a second cavity adjacent to the first cavity;
at least one heating unit located in a third cavity proximate to the second cavity; and
a ventilating unit having a ventilating fan to ventilate the third cavity,
wherein a high-voltage transformer and a high-voltage condenser installed in the first cavity apply a high voltage to the microwave generating unit, and a cooling fan installed in the first cavity cools the high-voltage transformer and the high-voltage condenser,
wherein the third cavity comprises a toasting cavity located above the second cavity that comprises a microwave cooking cavity, and the first cavity comprises a machine room located at a side of the toasting cavity and the microwave cooking cavity, and
wherein the toasting cavity and the microwave cooking cavity are opened at fronts thereof, and doors are mounted to the open fronts of the toasting cavity and the microwave cooking cavity, thus opening or closing the toasting cavity and the microwave cooking cavity, respectively.

12. The microwave oven according to claim 11, wherein the at least one heating unit comprises an upper heater installed at an upper position in the toasting cavity, and a lower heater installed at a lower position in the toasting cavity, and
a grill member is located above the lower heater, with bread being placed on the grill member.

13. The microwave oven according to claim 11, wherein the ventilating unit comprises:
an air inlet port provided at a predetermined location on a sidewall between the machine room and the toasting cavity;

the ventilating fan mounted at the location on the sidewall through which the air inlet port is formed, thus circulating air from the machine room into the toasting cavity; and an air outlet port at a predetermined location on a wall of the toasting cavity to discharge air from the toasting cavity to an outside.

14. The microwave oven according to claim 13, further including a deodorizing filter at the portion of the wall through which the air outlet port is formed, thus removing odors from the air which is discharged from the toasting cavity to the outside of the microwave oven.

15. The microwave oven according to claim 13, wherein an annular air guide member is on the sidewall through which the air inlet port is formed and guides air into the toasting cavity.

16. The microwave oven according to claim 13, further including a depressed seat located on a rear wall of the toasting cavity.

17. The microwave oven according to claim 16, further including a deodorizing filter seated into the depressed seat.

18. The microwave oven according to claim 17, wherein a perforated cover member is fastened to the depressed seat to cover the deodorizing filter.

19. The microwave oven according to claim 11, wherein the doors are rotated forward and backward to open or close the toasting cavity and the microwave cooking cavity, respectively.

20. A method of combining toasting and microwave cooking in a microwave oven, comprising:
partitioning a cabinet into a microwave cooking cavity, a toasting cavity, and a machine room, wherein the toasting cavity and the microwave cooking cavity are opened at fronts thereof, and doors are mounted to the open fronts of the toasting cavity and the microwave cooking cavity, thus opening or closing the toasting cavity and the microwave cooking cavity, respectively; and generating microwaves into the microwave cooking cavity utilizing a high-voltage transformer and a high-voltage condenser installed in the machine room to apply a high voltage to a microwave generating unit that generates microwaves, and using a cooling fan installed in the machine room to cool the high-voltage transformer and the high-voltage condenser; and heating the toasting cavity with a heating unit while ventilating the toasting cavity using a ventilating unit having a ventilating fan.

21. The method according to claim 20, wherein the partitioning comprises dividing the cabinet so that the toasting cavity is above the microwave cooking cavity, and the machine room is at a side of the toasting cavity and the microwave cooking cavity.

22. The method according to claim 20, wherein partitioning further comprises dividing the toasting cavity into an upper portion having an upper heater in the toasting cavity, a lower portion having a lower heater and a grill member above the lower heater so that the grill member supports food/bread to be toasted.

23. The method according to claim 20, wherein ventilating the toasting cavity using a ventilating unit comprises:
utilizing an air inlet port at a predetermined location on a sidewall between the machine room and the toasting cavity to provide access to air outside the microwave oven;

using the ventilating fan mounted on the sidewall through which the air inlet port is formed, to circulate air from the machine room into the toasting cavity; and using an air outlet port at a predetermined location of a wall of the toasting cavity to discharge air from the toasting cavity to an outside of the microwave oven.

24. The method according to claim 23, further comprising using a deodorizing filter at the portion of the wall through which the air outlet port is formed to remove odors from the air which is discharged from the toasting cavity to the outside of the microwave oven.

25. The method according to claim 20, wherein generating microwaves into the microwave cooking cavity and heating the toasting cavity with a heating unit while ventilating the toasting cavity using a ventilating unit are performed in an order comprising one of: simultaneously, in succession, and in reverse order.

* * * * *